March 3, 1942.　　　　J. W. THEISEN　　　　2,274,754
TRAILER
Filed July 22, 1940　　　　3 Sheets-Sheet 1
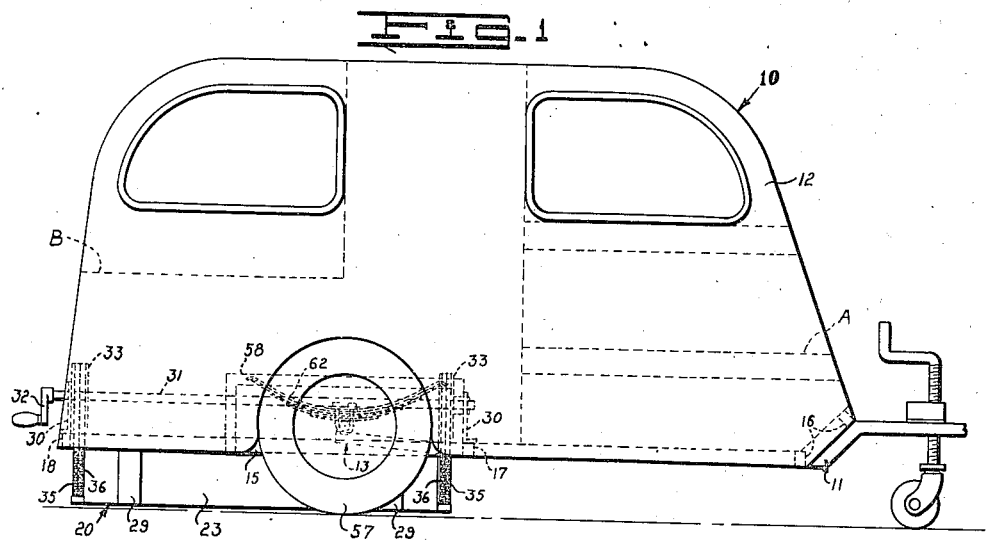
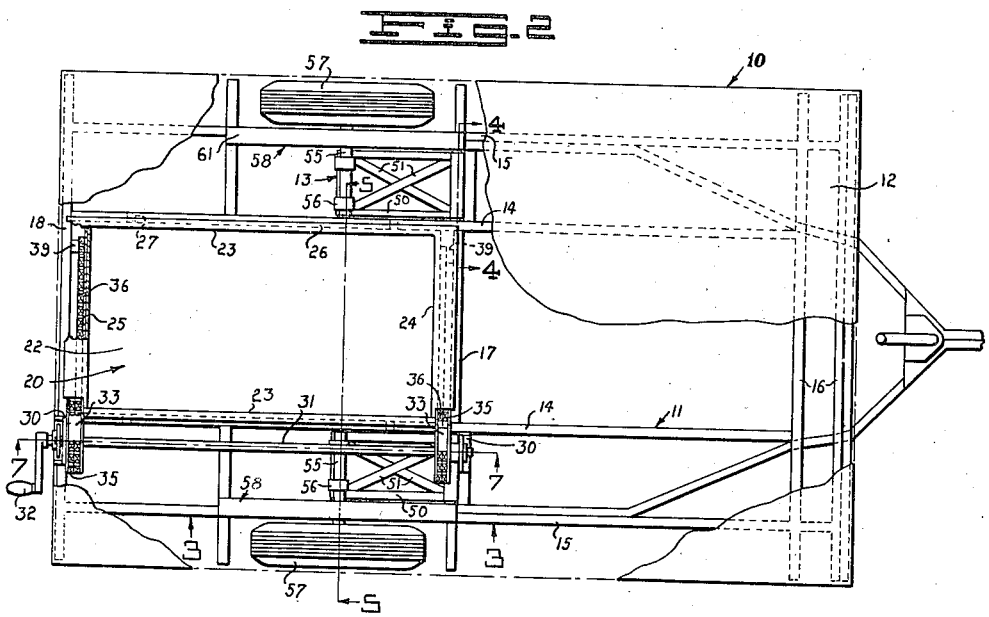
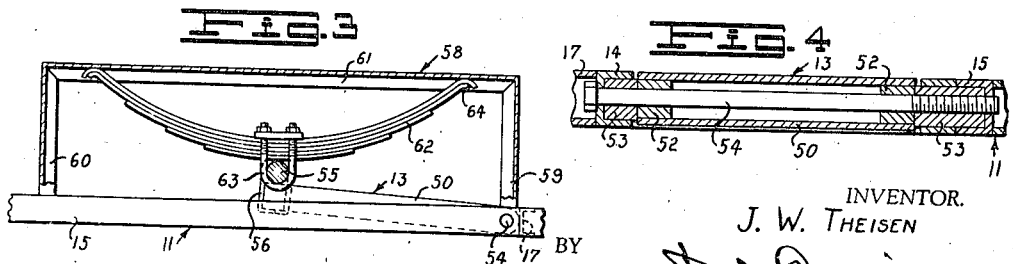
INVENTOR.
J. W. THEISEN
BY
ATTORNEY.

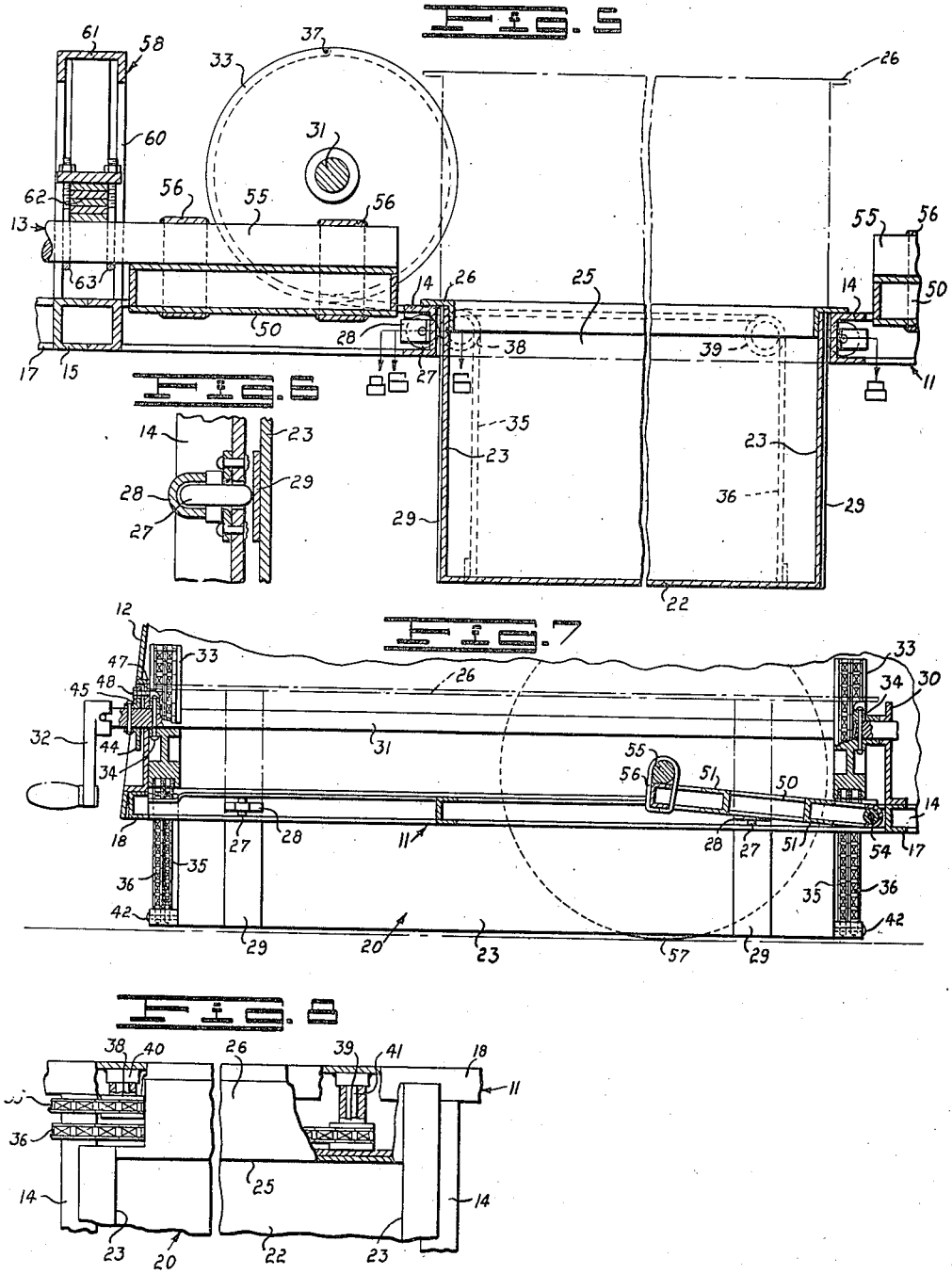

March 3, 1942.   J. W. THEISEN   2,274,754
TRAILER
Filed July 22, 1940   3 Sheets-Sheet 3
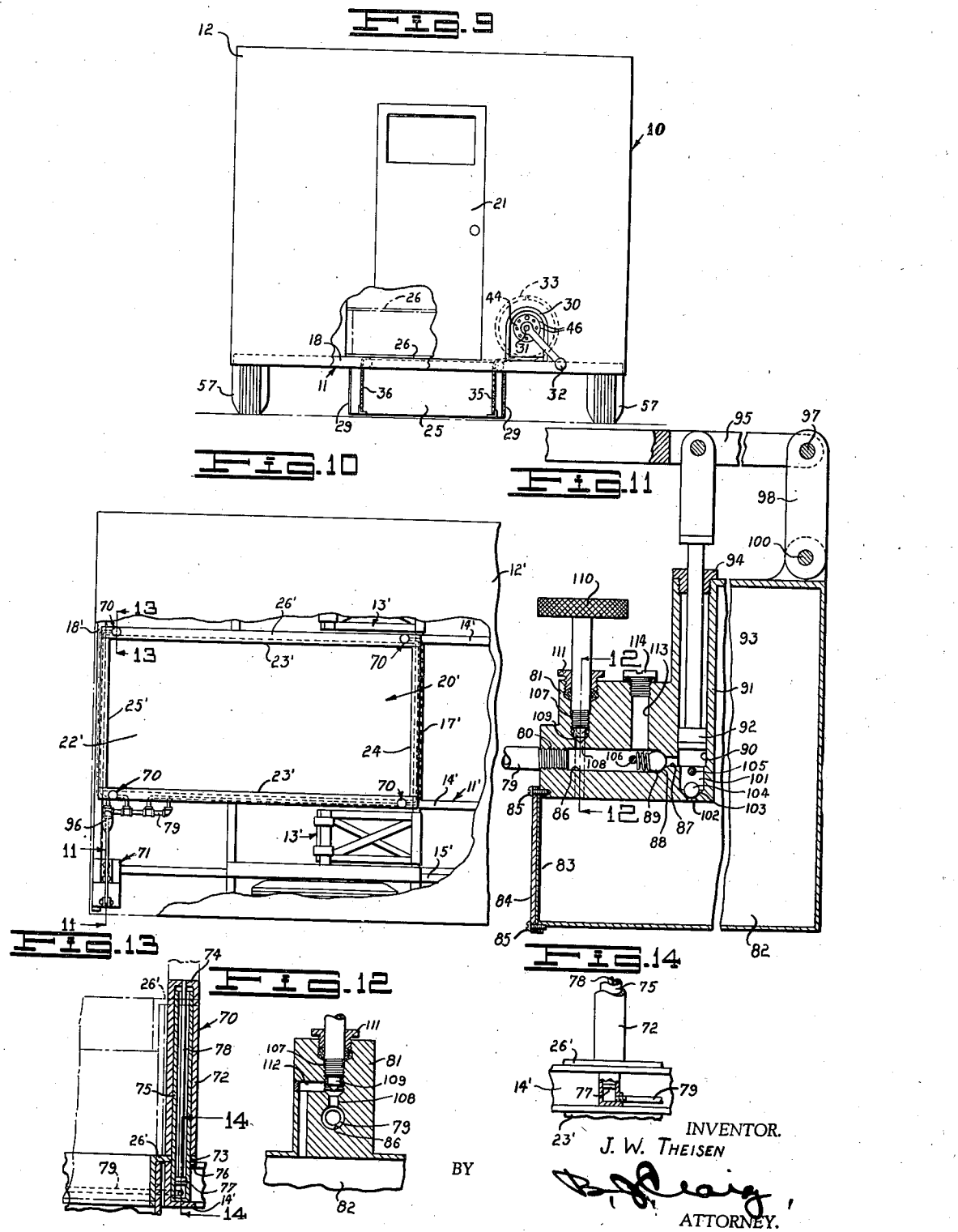
INVENTOR.
J. W. THEISEN
BY
ATTORNEY.

Patented Mar. 3, 1942

2,274,754

UNITED STATES PATENT OFFICE 2,274,754

TRAILER

Jacob W. Theisen, Pasadena, Calif.

Application July 22, 1940, Serial No. 346,710

1 Claim. (Cl. 296—23)

This invention relates to improvements in trailers.

The general object of the invention is to provide a novel trailer that is low in height while travelling but provides ample head room when stationary.

A more specific object of the invention is to provide a trailer wherein a portion of the floor is in the usual position while travelling but which may be lowered when stationary.

A further object of the invention is to provide novel means for raising and lowering a portion of the floor of a trailer.

Another object of the invention is to provide a novel wheel mounting particularly adaptable for use with my novel trailer.

Other objects and the advantages of the invention will be apparent from the following description taken in connection with the accompanying drawings, wherein:

Fig. 1 is a side elevation of a trailer embodying the features of my invention;

Fig. 2 is a top plan view of the trailer shown in Fig. 1 with parts broken away;

Fig. 3 is a sectional view taken on line 3—3, Fig. 2;

Fig. 4 is a sectional view taken on line 4—4, Fig. 2;

Fig. 5 is an enlarged fragmentary sectional view taken on line 5—5, Fig. 2;

Fig. 6 is a fragmentary sectional view taken on line 6—6, Fig. 5;

Fig. 7 is an enlarged sectional view taken on line 7—7, Fig. 2;

Fig. 8 is a sectional view taken on line 8—8, Fig. 5;

Fig. 9 is a rear view of the trailer shown in Fig. 1 with parts broken away;

Fig. 10 is a view similar to Fig. 2 but showing a modified form of floor raising means;

Fig. 11 is an enlarged sectional view taken on line 11—11, Fig. 10;

Fig. 12 is a sectional view taken on line 12—12, Fig. 11;

Fig. 13 is a sectional view taken on line 13—13, Fig. 10; and

Fig. 14 is a sectional view taken on line 14—14, Fig. 13.

Referring to the drawings by reference characters I have shown my invention as embodied in an improved trailer which is indicated generally at 10. A shown in Figs. 1, 2 and 9 the trailer 10 may be of the usual outside appearance but by virtue of my novel construction may be considerably lower in overall height so that it is more convenient in many ways. The trailer 10, as shown, includes a chassis frame 11, a body portion 12 and a wheel assembly 13.

As shown the frame 11 includes an inner pair of longitudinal members 14 and an outer pair 15 connected by suitable forward cross members 16, an intermediate cross member 17, and a rear cross member 18.

The interior of the trailer preferably includes sleeping and other accommodations such as indicated at A in the forward portion and further includes the usual cupboards, shelves and sink facilities indicated at B above the spaces between the two pairs of longitudinal members 14 and 15 and in the rear of the intermediate cross member 17. The space enclosed by the intermediate cross member 17, the rear cross member 18, and the inner longitudinal members 14 is occupied by a floor indicated generally at 20. As shown in Fig. 9 the interior of the trailer is accessible by a rear door 21. The floor 20 is flush with the bottom of the trailer while travelling but when stationary may be lowered so that it is then close to the ground thus increasing the space within the trailer and affording greater head room.

The floor 20 is preferably in the form of a tray or box having an open top. As shown the floor 20 includes a bottom 22, sides 23, a front end 24, and a rear end 25. Surmounting the upper edges of the sides and ends I provide an outwardly extending flange 26 which may be of angle-iron as shown in Fig. 5. When the floor 20 is in the lowered position, the flange 26 engages the upper sides of the longitudinal members 14 and the cross members 17 and 18. The sides 23 are engaged by rollers 27 (see Figs. 5 and 6) which are shown as mounted on brackets 28 secured to the longitudinal members 14. The rollers 27 may engage strips 29 secured to the sides 23.

To lift the floor 20 to the travelling position a pair of brackets 30 are secured to the cross members 17 and 18 between the longitudinal members 14 and 15 at one side of the frame. The cross member 17 may be constructed from a number of separate portions secured between the longitudinal members as shown. The brackets 30 rotatably support a shaft 31 which is adapted to be rotated by a removable crank 32. A pair of spaced flanged drums 33 are secured to the shaft 31 adjacent to ends of the flooring 20 as by pins 34.

A pair of chains 35 and 36 are secured to each of the drums 33 as by pins 37 and are adapted to be wound thereon when the crank 32 is turned counterclockwise. The chains 35 and 36 extend from the drums 33 over aligned and spaced sprocket wheels 38 and 39 which are rotatably mounted on suitable shafts 40 and 41 secured to the cross members 17 and 18 as shown in Figs. 5 and 8. The ends of the chains opposite the pin 37 are secured to the lower end of the flooring as by pins 42 as shown in Fig. 7.

When travelling the flooring 20 is in the raised position shown by broken lines in Figs. 5 and 9 and when parked the floor may be lowered by turning the crank 32 in a clockwise direction allowing the chains 35 and 36 to unwind from the drums 33 and roll over the sprocket wheels 38 or 39. By turning the crank in a counter clockwise direction the floor may be similarly raised.

In order to hold the floor 20 in the raised position or in any intermediate position a plate 44 is suitably secured to the shaft 31 adjacent the rear bracket 30 as by a pin 45. The plate 44 includes a plurality of apertures 46 (see Fig. 9) which are adapted to be aligned with a threaded aperture 47 in the adjacent bracket 30. A bolt 48 is provided which threadedly engages the aperture 47.

In operation the crank 32 is rotated until the floor 20 is at the desired height, whereupon the bolt 48 is inserted in the aperture 46 which is nearest to being aligned with the threaded aperture 47. The crank is then turned until the bolt is aligned and secured in the aperture 47.

The wheel assemblies 13 each includes a rectangular frame 50 having reinforcing cross members 51 and aligned bushings 52 in the forward edge thereof. The longitudinal members 14 and 15 include aligned bushings 53 arranged at the forward edge of the wheel assembly 13. The bushings 52 and 53 are aligned and receive a shaft 54 which pivotally supports the frame 50.

An axle 55 is secured to the frame 50 at the rear edge thereof as by brackets 56 and extends outwardly therefrom to support suitable wheels 57. Each of the wheel assemblies includes a spring arrangement comprising a channel member 58 having front and rear downwardly extending portions 59 and 60 secured to the longitudinal member 15 adjacent each wheel 57. The channel member further includes an upper portion 61 parallel to the frame 11.

A leaf spring 62 is secured to each axle 55 in alignment with the channel member 58 as by U-bolts 63 (see Fig. 3). The leaf springs 62 curve upwardly and include downwardly bent end portions 64 which are adapted to engage and slide on the portion 61 of the channel member 58.

In Figs. 10 to 14 I have shown a modification of my invention wherein similar parts are indicated by similarly primed reference characters. The modification includes a frame 11', body 12', wheel assemblies 13', longitudinal members 14' and 15' and cross members 17' and 18'. The modification further includes a floor 20' having a bottom 22', sides 23', front and rear ends 24' and 25' and an outwardly extending flange 26' surmounting the upper edges of the sides and ends thereof.

To raise and lower the floor 20' I provide a plurality of spaced hydraulic jacks 70 adapted to be operated by a hydrauilc pump 71.

The hydraulic jacks 70 include a tube 72 which is welded or otherwise secured in alignment with an aperture 73 in the flange 26'. The tube 72 being provided with a closed upper end 74. A second tube 75 is welded or otherwise secured in an aperture 76 in the longitudinal member 14' which is in turn aligned with the aperture 73.

The tube 75 is slidably positioned within the tube 72 and receives a plunger 77.

The plunger 77 is connected to a plunger rod 78 which is in turn secured to the upper end 74 of the tube 72 as by welding or the like. The lower end of the tube 75 of the jacks 70 is connected to one end of a conduit 79. The other end of the conduit 79 is threadedly secured in a threaded aperture 80 in a pump block 81 which is integral with an oil reservoir 82 which is in turn secured to the cross member 18'. The reservoir 82 has an open end 83 which is closed by a closure 84 secured in place as by screws 85.

The pump block 81 is provided with a bore 86 which communicates with the conduit 79 and includes a reduced portion 87 which forms a valve seat 88 for a valve ball 89. Beyond the reduced portion 87 a conduit 90 communicates with the lower end of a cylinder 91 in which a plunger 92 is adapted to operate. The plunger 92 is secured to a rod 93 which extends upwardly through an apertured closure member 94. The rod 93 is secured intermediate the length of a rocker arm 95. One end of the rocker arm is provided with a handle 96 and the other end is pivoted as at 97 to a link 98 which is in turn pivoted as at 100 to the upper side of the reservoir 82.

The lower end of the cylinder includes a chamber 101 which has a reduced portion 102 to provide a valve seat 103 which receives a valve ball 104. The reduced portion 102 communicates with the interior of the reservoir 82. The movement of the balls 89 and 104 is limited by pins 105 and 106 in the pump block.

The interior of the chamber 86 also communicates with a threaded aperture 107 through a reduced portion 108. A valve 109 threadedly engages the aperture 107 and seats on the reduced portion 108. The valve 109 is provided with a handle 110 which extends through an apertured packing nut 111. The aperture 107 communicates by means of a conduit 112 with the container 82 (see Fig. 12).

The pump block 81 further includes a filling opening 113 which communicates with the interior of the chamber 86 and thus communicates with the container 82. The opening 113 is provided with a closure member 114.

In operation the valve 109 is opened allowing the oil to flow from the jacks 70 back into the reservoir 82 through the conduits 108 and 112 thus lowering the floor 20'. This action can be stopped at any time by closing the valve 109. To raise the floor 20' to travelling position, the valve 109 is closed and the handle 96 reciprocated actuating the piston 92 and causing the oil to be pumped from the reservoir 82 past the valve balls 104 and 89 in the chambers 101 and 86 and thus through the conduits 79 to the jacks 70.

From the foregoing description it will be apparent that I have invented a novel trailer which may be economically manufactured and which is highly efficient for its intended purpose.

Having thus described my invention I claim:

In a trailer, a chassis frame including a pair of inner longitudinal members and a pair of outer longitudinal members, said frame further including a forward cross member, an intermediate cross member, and a rear cross member, a single floor member disposed between said inner pair of longitudinal members and said intermediate cross member and said rear cross member, means to mount said floor member for vertical movement between said longitudinal members and said cross members, said floor member comprising an open topped, rectangular, box having a bottom with parallel rigid sides and parallel ends thereon, said box sides and ends including outwardly directed flange portions engageable with said inner longitudinal members and said intermediate and rear cross members when said floor is in a lower position, guiding means disposed on said longitudinal members and engaging the sides of said floor member, a shaft mounted adjacent one of said inner longitudinal members and extending from said intermediate cross member to said rear cross member and having a drum secured thereto adjacent each end, a pair of cables secured to each drum, means to secure each of said cables to a corner of said floor member, guide means engaging said cables and means to rotate said shaft, rotation of said shaft causing vertical movement of said floor member.

JACOB W. THEISEN.